United States Patent
Wu et al.

(10) Patent No.: US 11,164,379 B2
(45) Date of Patent: Nov. 2, 2021

(54) AUGMENTED REALITY POSITIONING METHOD AND APPARATUS FOR LOCATION-BASED SERVICE LBS

(71) Applicant: BAIDU ONLINE NETWORK TECHNOLOGY (BEIJING) CO., LTD., Beijing (CN)

(72) Inventors: Zhongqin Wu, Beijing (CN); Miao Yao, Beijing (CN); Yongjie Zhang, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 79 days.

(21) Appl. No.: 15/991,343

(22) Filed: May 29, 2018

(65) Prior Publication Data

US 2018/0357824 A1   Dec. 13, 2018

(30) Foreign Application Priority Data

Jun. 8, 2017 (CN) .......................... 201710428342.7

(51) Int. Cl.
*G06T 19/00* (2011.01)
*H04L 29/08* (2006.01)
(Continued)

(52) U.S. Cl.
CPC .............. *G06T 19/006* (2013.01); *G06T 7/70* (2017.01); *H04L 67/18* (2013.01); *H04W 4/023* (2013.01)

(58) Field of Classification Search
CPC ....... G06T 19/006; H04L 67/18; H04W 4/023
See application file for complete search history.

(56) References Cited

U.S. PATENT DOCUMENTS

2002/0069013 A1* 6/2002 Navab .................... G01C 21/20
                                                         701/522
2011/0181598 A1* 7/2011 O'Neall ................ G06T 11/206
                                                         345/440
(Continued)

FOREIGN PATENT DOCUMENTS

CN          102801788 A    11/2012
CN          103105993 A     5/2013
(Continued)

OTHER PUBLICATIONS

English Translation of CN106982240A (Year: 2016).*
(Continued)

*Primary Examiner* — Samantha (Yuehan) Wang
(74) *Attorney, Agent, or Firm* — Brooks Kushman P.C.

(57) ABSTRACT

An augmented reality positioning method and apparatus for location-based service LBS, comprising: a first terminal obtains image information captured by a camera, and receives AR information transmitted by a server; the AR information is generated according to location information of a second terminal; the first terminal displays the image information drawn with the AR information. The apparatus avoids the following drawbacks in the prior art: location inaccuracy; when the terminals are close to each other, positioning cannot be performed on the interfaces of the terminals; if the environment is complicated, it is difficult for the user to quickly perform accurate and direct judgment, and even impossible to obtain more accurate mutual suggestive location information. The apparatus enables the user to perform quick positioning judgment making it possible to directly combine more interactable content or presented information with a real scenario using mobile terminals such as mobile phones without extra hardware.

22 Claims, 6 Drawing Sheets

(51) Int. Cl.
*H04W 4/02* (2018.01)
*G06T 7/70* (2017.01)

(56) References Cited

U.S. PATENT DOCUMENTS

| | | | |
|---|---|---|---|
| 2013/0050259 A1 | 2/2013 | Ahn et al. | |
| 2015/0193982 A1* | 7/2015 | Mihelich | H04L 67/18 |
| | | | 345/633 |
| 2015/0269190 A1* | 9/2015 | Shih | G06F 16/583 |
| | | | 382/104 |
| 2015/0281880 A1 | 10/2015 | Song et al. | |
| 2016/0307289 A1* | 10/2016 | Choksi | G06Q 10/06311 |
| 2017/0103452 A1* | 4/2017 | Hertel | G06Q 30/08 |
| 2018/0114065 A1* | 4/2018 | Zeng | H04W 4/023 |
| 2018/0322707 A1* | 11/2018 | Zhang | G06T 11/00 |

FOREIGN PATENT DOCUMENTS

| | | | | |
|---|---|---|---|---|
| CN | 105229417 A | | 1/2016 | |
| CN | 106982240 A | * | 1/2016 | G06T 11/60 |
| CN | 105973231 A | | 9/2016 | |
| CN | 106250187 A | | 12/2016 | |
| CN | 106767754 A | | 5/2017 | |

OTHER PUBLICATIONS

Chinese Office Action dated Nov. 28, 2019, for related Chinese Appln. No. 201710428342.7; 16 Pages.
Chinese Search Report dated Nov. 14, 2019 for related Chinese Appln. No. 201710428342.7; 3 Pages.

* cited by examiner

AUGMENTED REALITY POSITIONING METHOD AND APPARATUS FOR LOCATION-BASED SERVICE LBS

The present application claims the priority of Chinese Patent Application No. 2017104283427, filed on Jun. 8, 2017, with the title of "Augmented reality positioning method and apparatus for location-based service LBS". The disclosure of the above applications is incorporated herein by reference in its entirety.

FIELD OF THE DISCLOSURE

The present disclosure relates to the field of Internet application, and particularly to an augmented reality positioning method and apparatus for location-based service LBS.

BACKGROUND OF THE DISCLOSURE

Current terminals such as mobile phones mostly have a positioning function. A positioning module is built in a terminal which may perform positioning via a positioning system such as Global Positioning System (GPS) or a base station to obtain a geographical location of the terminal. The positioning function of the terminal enables a user to acquire his own geographical location even if he is in an unfamiliar environment and not to get lost.

In real life, the positioning function of the terminal is applied in many aspects, for example, LBS (Location Based Service). Three major goals of LBS are: where are you, who are you together with, and what resources are there nearby, wherein "where are you" is a kernel of the LBS. Dual-terminal users may perform positioning via the GPS modules of the mobile terminals, display location information on interfaces of their terminals, and meanwhile obtain substantially rough prompts of route navigation planning, distance and direction. For example, in some ride-hailing applications, a user and a driver share locations to facilitate accurate acquisition of the user and driver's current locations.

However, the positioning of the GPS based on a consumption-level mobile terminal (e.g., a mobile phone or a tablet computer) has the following drawbacks:

The obtained location is usually inaccurate. For example, as for a location positioned by the GPS, there might occur a deviation of tens of meters due to factors such as an environment factor, and it is difficult to obtain precise geographical location information so that the navigation route is inaccurate.

After the terminals enter a location where they are close to each other and the positioning information is substantially in a coincident or close-to-each other range, positioning cannot be performed on the interfaces of the terminals.

If the environment is complicated, for example in the case that the outdoor environment is complicated and there are many barriers, it is very difficult for the user to quickly perform accurate and direct judgment, and completely impossible to obtain more accurate mutual suggestive location information. Even in some cases, even though the GPS geographical location information of the two terminals is very close even coincident, accurate final path information judgment cannot be smoothly obtained due to various environment factors (e.g., blocking, dim light, weather or the like), and the user's experience is affected seriously.

SUMMARY OF THE DISCLOSURE

A plurality of aspects of the present disclosure provide an augmented reality positioning method and apparatus for location-based service LBS, to help the user to quickly position another one terminal or more terminals to be found.

According to an aspect of the present disclosure, there is provided an augmented reality positioning method for location-based service LBS, comprising:

a first terminal obtains image information captured by a camera, and receives AR information transmitted by a server; the AR information being generated according to location information of a second terminal;

the first terminal displays the image information drawn with the AR information.

The above aspect and any possible implementation mode further provide an implementation mode:

the direction information comprises a tilt angle posture of the terminal.

The above aspect and any possible implementation mode further provide an implementation mode:

the first terminal obtaining image information captured by the camera comprises:

capturing an event that a real scene navigation function is triggered, and activating the camera of the first terminal; wherein the event that real scene navigation function is triggered comprises: click of a real scene navigation button, or the tilt angle posture of the first terminal being in a preset range.

The above aspect and any possible implementation mode further provide an implementation mode: the method further comprises:

the first terminal transmits the location direction and direction information to the server;

the AR information comprises a 3D model carrying the location and direction information of the first terminal and the location information of the second terminal;

the image information drawn with the AR information is drawn by the first terminal.

The above aspect and any possible implementation mode further provide an implementation mode: the method further comprises:

the first terminal transmits the location direction and direction information to the server;

the first terminal transmits the image information to the server;

the first terminal receiving the AR information transmitted by the server comprises: the first terminal receiving the image information transmitted by the server end and drawn with the AR information.

The above aspect and any possible implementation mode further provide an implementation mode: the AR information comprises:

distance information of the first terminal and second terminal, relevant prompt auxiliary information.

According to another aspect of the present disclosure, there is provided an augmented reality positioning method for location-based service LBS, comprising:

the server receives location information and direction information transmitted by terminals, and the terminals comprise a first terminal and a second terminal;

the server transmits AR information to the first terminal, and the AR information is generated based on location information of the second terminal so that the first terminal, upon obtaining image information captured by a camera, displays the image information drawn with the AR information.

The above aspect and any possible implementation mode further provide an implementation mode: the direction information comprises a tilt angle posture of the terminal.

The above aspect and any possible implementation mode further provide an implementation mode: the first terminal obtaining image information captured by the camera comprises:

capturing an event that a real scene navigation function is triggered, and activating the camera of the first terminal; wherein the event that real scene navigation function is triggered comprises: click of a real scene navigation button, or the tilt angle posture of the first terminal being in a preset range.

The above aspect and any possible implementation mode further provide an implementation mode: the method further comprises:

the AR information comprises a 3D model carrying the location and direction information of the first terminal and the location information of the second terminal;

the image information drawn with the AR information is drawn by the first terminal.

The above aspect and any possible implementation mode further provide an implementation mode: the method further comprises:

receiving the image information transmitted by the first terminal;

the server transmitting the AR information to the first terminal comprises: the server transmits the image information drawn with the AR information to the first terminal.

The above aspect and any possible implementation mode further provide an implementation mode: the AR information comprises:

distance information of the first terminal and second terminal, relevant prompt auxiliary information.

According to another aspect of the present disclosure, there is provided an augmented reality positioning apparatus for location-based service LBS, comprising:

a positioning module configured to obtain location information and direction information of a terminal;

a transmitting module configured to transmit the location direction and direction information to a server;

a receiving module configured to receive AR information transmitted by the server, the AR information being generated according to the location information of the second terminal;

a display module configured to display the image information drawn with the AR information.

The above aspect and any possible implementation mode further provide an implementation mode: the AR information comprises a 3D model carrying the location and direction information of the first terminal and the location information of the second terminal;

the apparatus further comprises a drawing module configured to draw the AR information to the image information.

The above aspect and any possible implementation mode further provide an implementation mode:

the transmitting module is used to transmit the image information to the server;

the receiving the AR information transmitted by the server comprises: receiving the image information transmitted by the server end and drawn with the AR information.

According to a further aspect of the present disclosure, there is provided an augmented reality positioning apparatus for location-based service LBS, comprising:

a receiving module configured to receive location information and direction information transmitted by terminals, the terminals comprising a first terminal and a second terminal;

a transmitting module configured to transmit AR information to the first terminal, the AR information being generated based on the location information and direction information of the second terminal so that the first terminal, upon obtaining image information captured by a camera, displays the image information drawn with the AR information.

The above aspect and any possible implementation mode further provide an implementation mode:

the AR information comprises a 3D model carrying the location and direction information of the first terminal and the location information of the second terminal;

the image information drawn with the AR information is drawn by the first terminal.

The above aspect and any possible implementation mode further provide an implementation mode:

the receiving module is configured to receive the image information transmitted by the first terminal;

the transmitting the AR information to the first terminal comprises: transmitting the image information drawn with the AR information to the first terminal.

According to a further aspect of the present disclosure, there is provided an apparatus, wherein the apparatus comprises:

one or more processors;

a storage device for storing one or more programs, when said one or more programs are executed by said one or more processors, said one or more processors are enabled to implement the above-mentioned method.

According to a further aspect of the present disclosure, there is provided a computer readable storage medium on which a computer program is stored, wherein the program, when executed by a processor, implements the above-mentioned method.

As known from the above technical solutions defined in the embodiments of the present disclosure, the image information captured by the camera is obtained, and the image information drawn with the AR information is displayed, to help the user to quickly position another one terminal or more terminals to be found.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be acquired from these figures without making inventive efforts.

DETAILED DESCRIPTION OF PREFERRED EMBODIMENTS

Figure 1:
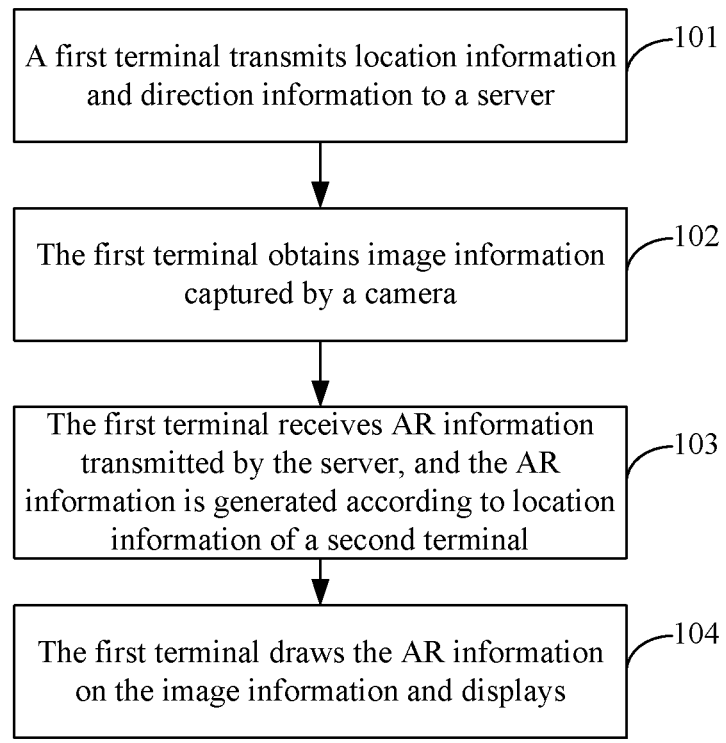
FIG. 1 is a flow chart of an augmented reality positioning method for location-based service LBS according to an embodiment of the present disclosure.

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments acquired by those having ordinary skill in the art based on the embodiments of the present disclosure, without making any inventive efforts, fall within the protection scope of the present disclosure.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

In the depictions hereunder, it is assumed that a first terminal and a second terminal are provided. However, the provided first terminal and second terminal are configured to illustrate embodiments of the present disclosure, and technical ideas of the present disclosure are not limited to this. For example, exemplary embodiments of the present disclosure may be adapted to provide navigation and positioning situations to a plurality of terminals.

The terminal comprises a smart terminal device such as a mobile phone or a tablet computer. Operating systems installed on the smart terminal device comprise but are not limited to iOS, Android, Windows, Linux and Mac OS.

The first terminal and the second terminal activate a plane navigation mode according to the user's instruction to enter the plane navigation mode, and respectively send a navigation request to a server.

The navigation request respectively includes location information of the first terminal/second terminal.

The server, based on the location information of the first terminal and second terminal, calculates a first path from a location of the first terminal to a location of the second terminal to navigate the first terminal towards the second terminal; calculates a second path from the location of the second terminal to the location of the first terminal to navigate the second terminal towards the first terminal.

An exemplary embodiment of the present disclosure provides an augmented reality positioning method for location-based service LBS, wherein the augmented reality positioning mode is activated when a relative distance of the first terminal and the second terminal is smaller than a preset threshold. The terminal acquires an image or video of real-time surrounding environment via a camera, generates virtual AR information having peer GPS location information and superimposes it on the image or video, and displays on the terminal screen.

The preset threshold may be set according to actual needs, for example may be set as 20 meters. That is, judgment is made as to whether the relative distance of the first terminal and second terminal is smaller than 20 meters. If the relative distance is judged as being smaller than 20 meters, it is believed that the first terminal and second terminal enter a short-distance scope.

FIG. 1 is a flow chart of an augmented reality positioning method for location-based service LBS according to an embodiment of the present disclosure. As shown in FIG. 1, the method comprises the following steps:

In 101, the first terminal transmits location information and direction information to the server;

In the present embodiment, the first terminal is a mobile terminal of a ride-hailing user.

The first terminal may acquire its own location information via a satellite navigation system such as GPS, GLONASS or BeiDou; may acquire its own direction information (e.g., azimuth information or geomagnetic information) via an inertia navigation unit such as a gyro or a magnetometer. The direction information further comprises a tilt angle posture of the terminal, namely, an angle between the terminal and a horizontal plane.

Preferably, it is possible to transmit information only when detection information (at least one of GPS positioning information, azimuth information and geomagnetic information) changes as the first terminal moves and/or the direction of the first terminal changes, other than constantly transmitting information from the first terminal to the server.

In 102, the first terminal obtains image information captured by the camera;

Wherein the user holds the first terminal with a hand, and the camera arranged on the back of the first terminal faces towards a direction in which the user advances, whereupon the image information including images or video data is obtained via the camera arranged on the back of the first terminal.

Specifically, the step comprises:

according to a captured event that real scene navigation function is triggered, activating the camera of the first terminal, and obtaining image information at a current location and in a current direction as captured by the camera. The event that real scene navigation function is triggered comprises:

A virtual key for activating the real scene navigation is provided in a plane navigation interface. When the user clicks the virtual key to activate real scene navigation, the camera arranged on the back of the first terminal is activated. The camera captures the image or video data at the current location and in the current direction. Exemplarily, it is possible to set the virtual key for activating the real scene navigation at a right upper corner of the navigation interface.

If it is monitored that the first terminal is in a state of a plane navigation interface and the tilt angle posture of the first terminal is in a preset vertical range, namely, an angle between the first terminal and the horizontal plane is within a preset angle interval, exemplarily the preset angle interval is 70°-90°, the camera arranged on the back of the first terminal is activated to acquire the image or video data at the current location and in the current direction.

Preferably, it is feasible to modify the location and direction information of the terminal through mode recognition technology/image contrast technology of image frames or video key frames; specifically, The first terminal transmits the captured image or video data at the current location and in the current direction to the server;

The first terminal receives calibrated location and direction information transmitted by the server, and the calibrated location and direction information is calibrated according to the image or video data;

A database including a lot of real scene pictures/three-dimensional model-building images is pre-arranged in the server, and the real scene pictures/three-dimensional model-building images are stored corresponding to corresponding location and direction information; the image frames or video key frames are obtained by processing the image or video data transmitted by the first terminal; the location and direction information of the first terminal is calibrated by comparing the real scene pictures/three-dimensional model-building images.

The location information determined by the positioning system has certain errors, but may substantially determine a substantial geographical location range. More accurate location and direction information of the first terminal may be obtained through the above processing.

In 103, the first terminal receives AR information transmitted by the server, and the AR information is generated according to the location information of the second terminal.

Specifically,

The AR information comprises: a 3D model carrying the location and direction information of the first terminal and the location information of the second terminal. The AR information further comprises: distance information of the first terminal and second terminal, relevant prompt auxiliary information such as user-related personal information, and other information that can be further obtained through a judgment account such as the called taxi driver's information, car model information and car plate number information. The AR information is used to present, in an augmented reality manner, the location information of the second terminal in the image or video data captured by the first terminal.

A 3D model of a navigation area is preset in the server. The 3D model carrying the location and direction information of the first terminal and location information of the second terminal is generated according to the location and direction information of the first terminal and the location information of the second terminal.

In 104, the first terminal draws the AR information on the image information and displays.

Spatial calculation is performed according to the 3D model, the location information of the second terminal is mapped to a 2-dimensional location of a view finder of the camera of the first terminal, and the AR information is displayed at the 2-dimensional location.

Specifically, the AR information is drawn on the image frame or video stream by using a computer graph processing technology.

The AR information and the image frame or video stream are subject to a rendering operation to finally obtain an image frame or video stream for output;

The frame image or video stream obtained by rendering is drawn in a memory for input;

The image frame or video stream drawn in the memory is displayed on a screen of the first terminal.

Figure 2:
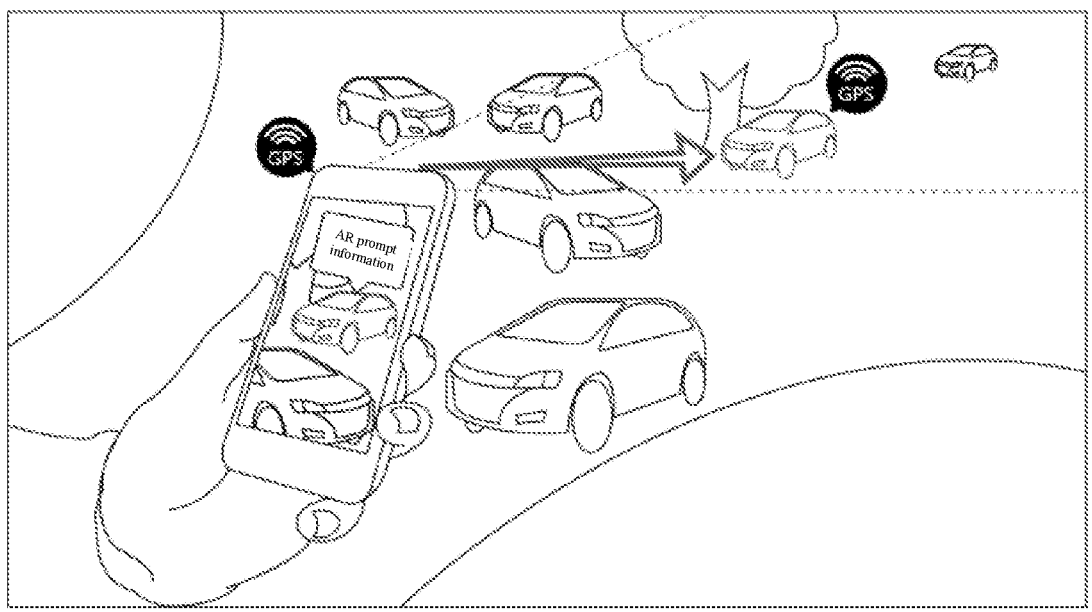
FIG. 2 is schematic diagram of use of an augmented reality positioning method for location-based service LBS according to an embodiment of the present disclosure.

Preferably, as shown in FIG. 2, the AR information is displayed in the image frame or video stream in the form of a symbol or icon such as an arrow or a balloon-shaped guide identifier and used to indicate the second terminal. The display content comprises the location of the second terminal, and distance information of the first terminal and second terminal; may further comprise other relevant auxiliary information such as the user-related personal information and other information that can be further obtained through a judgment account.

Figure 3:
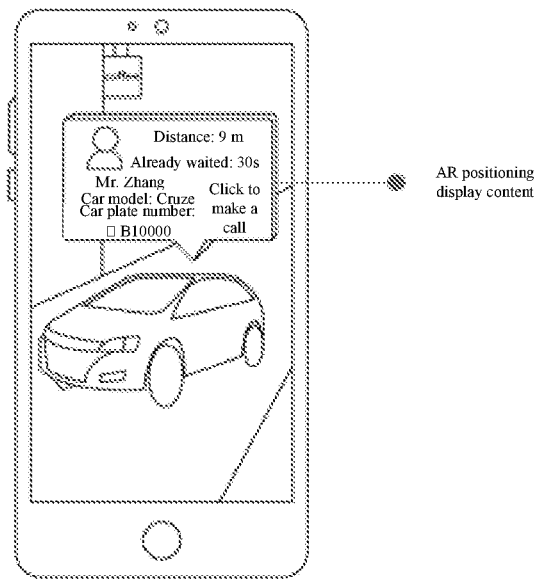
FIG. 3 is a schematic diagram of a human-machine interaction interface of an augmented reality positioning method for location-based service LBS according to an embodiment of the present disclosure.

Preferably, the first terminal further provides a human-machine interaction interface. The symbol or icon is clicked on a display unit to further display other relevant auxiliary information such as the user-related personal information and other information that can be further obtained through a judgment account. For example, as shown in FIG. 3, the symbol or icon may be clicked to further display auxiliary information such as a taxi driver's information like name, car model, car plate number, the distance between the first terminal and second terminal, and wait duration; furthermore, there is further included a virtual key which is clicked to make a phone call. The virtual key may be clicked to invoke a phone function to contact with the taxi driver.

Preferably, when the direction information of the first terminal changes, for example, when the first terminal moves up, down, leftward, rightward, forward, backward or angularly, the first terminal, according to a sensor's latest data, re-calculates the latest data in real time and updates the latest data in the current image frame or video stream.

Figure 4:
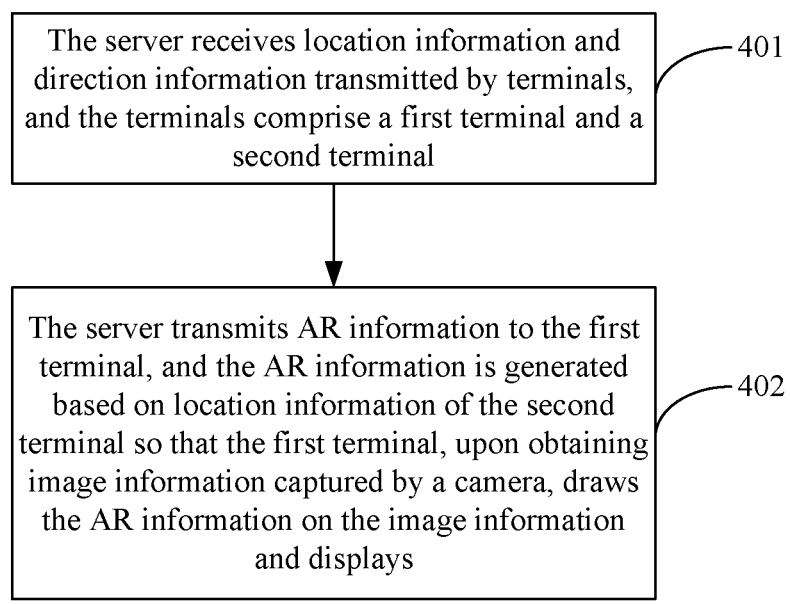
FIG. 4 is a flow chart of an augmented reality positioning method for location-based service LBS according to an embodiment of the present disclosure.

Correspondingly, FIG. 4 is a flow chart of an augmented reality positioning method for location-based service LBS according to another embodiment of the present disclosure. As shown in FIG. 4, the method comprises:

401: the server receives location information and direction information transmitted by terminals, and the terminals comprise a first terminal and a second terminal;

In the present embodiment, the first terminal is the ride-hailing user's mobile terminal, and the second terminal is a called taxi driver's mobile terminal.

402: the server transmits AR information to the first terminal. The AR information is generated based on location information of the second terminal so that the first terminal, upon obtaining image information captured by the camera, draws the AR information on the image information and displays.

The AR information comprises: a 3D model carrying the location and direction information of the first terminal and the location information of the second terminal. The AR information further comprises: distance information of the first terminal and second terminal, relevant prompt auxiliary information such as user-related personal information, and other information that can be further obtained through a judgment account such as a called taxi driver's information, car model information and car plate number.

A 3D model of a navigation area is preset in the server. The 3D model carrying the location and direction information of the first terminal and location information of the second terminal is generated according to the location and direction information of the first terminal and the location information of the second terminal. The server transmits the 3D model to the first terminal so that the first terminal performs spatial calculation according to the 3D model, maps the location information of the second terminal to a 2-dimensional location of a view finder of the camera of the first terminal, and displays the AR information at the 2-dimensional location.

Figure 5:
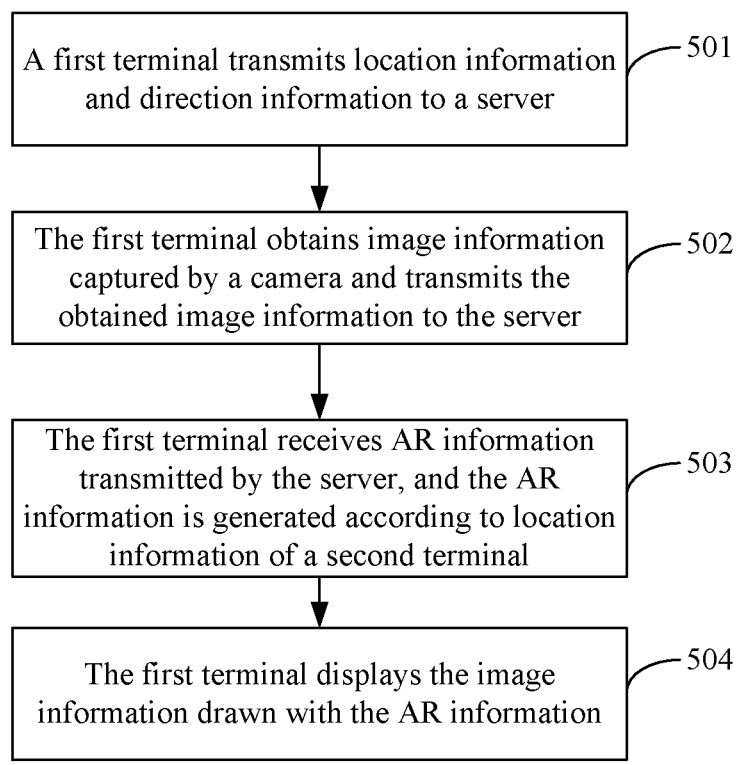
FIG. 5 is a flow chart of an augmented reality positioning method for location-based service LBS according to another embodiment of the present disclosure.

FIG. 5 is a flow chart of an augmented reality positioning method for location-based service LBS according to another embodiment of the present disclosure. As shown in FIG. 5, the method comprises the following steps:

In 501, the first terminal transmits location information and direction information to the server;

In the present embodiment, the first terminal is a mobile terminal of a ride-hailing user.

The terminal may acquire the location information via a satellite navigation system such as GPS, GLONASS or BeiDou; may acquire the direction information (e.g., azimuth information or geomagnetic information) via an inertia navigation unit such as a gyro or a magnetometer. The direction information further comprises a tilt angle posture of the terminal, namely, an angle between the terminal and a horizontal plane.

Preferably, it is possible to transmit information only when detection information (at least one of GPS positioning information, azimuth information and geomagnetic information) changes as the terminal moves and/or the direction of the terminal changes, other than constantly transmitting information from the terminal to the server.

In 502, the first terminal obtains image information captured by the camera and transmits the obtained image information to the server;

Wherein the user holds the first terminal with a hand, and the camera arranged on the back of the first terminal faces towards a direction in which the user advances, whereupon the image information including image or video data is obtained via the camera arranged on the back of the first terminal.

Specifically, the step comprises:

According to a captured event that real scene navigation function is triggered, activating the camera of the first terminal, and obtaining image information at a current location and in a current direction as captured by the camera. The event that real scene navigation function is triggered comprises:

A virtual key for activating the real scene navigation is provided in a plane navigation interface. When the user clicks the virtual key to activate real scene navigation, the camera arranged on the back of the first terminal is activated. The camera captures the image information at the current location and in the current direction. Exemplarily, it is possible to set the virtual key for activating the real scene navigation at a right upper corner of the navigation interface.

If it is monitored that the first terminal is in a state of a plane navigation interface and the tilt angle posture of the first terminal is in a preset vertical range, namely, an angle between the first terminal and the horizontal plane is within a preset angle interval, exemplarily the preset angle interval is 70°-90°, the camera arranged on the back of the first terminal is activated to acquire the image information at the current location and in the current direction.

In 503, the first terminal receives AR information transmitted by the server, and the AR information is generated according to the location information of the second terminal.

Specifically, the first terminal receiving the AR information transmitted by the server comprises: the first terminal receiving the image information transmitted by the server end and drawn with the AR information. The AR information further comprises: distance information of the first terminal and second terminal, relevant prompt auxiliary information such as user-related personal information, and other information that can be further obtained through a judgment account, for example, the called taxi driver information, car model information and car plate number information. The AR information is used to present, in an augmented reality manner, the location information of the second terminal in the image or video data captured by the first terminal.

A 3D model of a navigation area is preset in the server. The 3D model carrying the location and direction information of the first terminal and location information of the second terminal is generated according to the location and direction information of the first terminal and the location information of the second terminal.

Specifically, the server performs spatial calculation according to the 3D model, maps the location information of the second terminal to a 2-dimensional location of a view finder of the camera of the first terminal, and displays the AR information at the 2-dimensional location. Specifically, the AR information is drawn on the image information by using a computer graph processing technology, to obtain the image information sent to the first terminal for display and drawn with the AR information.

In 504, the first terminal displays the image information drawn with the AR information on its display module.

Preferably, as shown in FIG. 2, the AR information is displayed in the image information in the form of a symbol or icon such as an arrow or a balloon-shaped guide identifier and used to indicate the second terminal. The display content comprises the location of the second terminal, and distance information of the first terminal and second terminal; may further comprise other relevant auxiliary information such as the user-related personal information and other information that can be further obtained through a judgment account.

Preferably, the first terminal further provides a human-machine interaction interface. The symbol or icon is clicked on a display unit to further display other relevant auxiliary information such as the user-related personal information and other information that can be further obtained through a judgment account. For example, as shown in FIG. 3, the symbol or icon may be clicked to further display auxiliary information such as a taxi driver's information like name, car model, car plate number, the distance between the first terminal and second terminal, and wait duration; furthermore, there is further included a virtual key which is clicked to make a phone call. The virtual key may be clicked to invoke a phone function to contact with the taxi driver.

Figure 6:
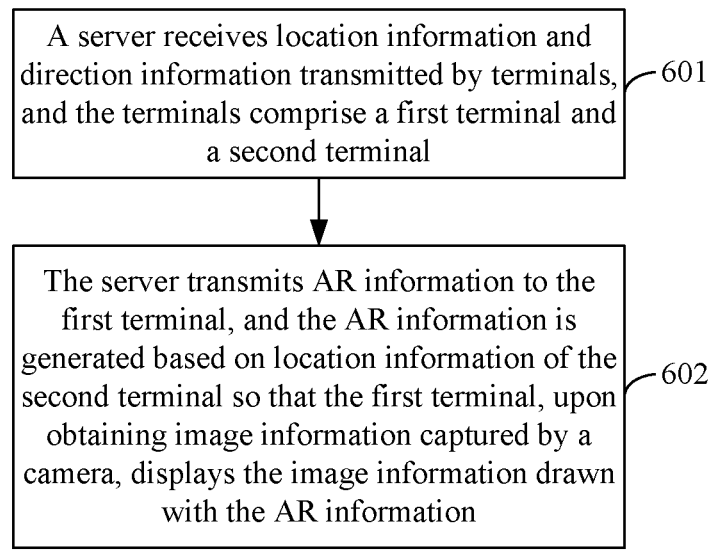
FIG. 6 is a flow chart of an augmented reality positioning method for location-based service LBS according to another embodiment of the present disclosure.

Correspondingly, FIG. 6 is a flow chart of an augmented reality positioning method for location-based service LBS according to another embodiment of the present disclosure. As shown in FIG. 6, the method comprises:

601: the server receives location information and direction information transmitted by terminals, and the terminals comprise a first terminal and a second terminal;

Specifically, the server receives image information transmitted by the first terminal and captured by the camera.

602: the server transmits AR information to the first terminal. The AR information is generated based on location information and direction information of the second terminal so that the first terminal, upon obtaining image information captured by the camera, displays the image information drawn with the AR information.

The server sending AR information to the first terminal comprises: the server transmits the image information drawn with the AR information to the first terminal. The AR information further comprises: distance information of the first terminal and second terminal, relevant prompt auxiliary information such as user-related personal information, and other information that can be further obtained through a judgment account, for example, the called taxi driver information, car model information and car plate number information.

Specifically, a 3D model of a navigation area is preset in the server. The 3D model carrying the location and direction information of the first terminal and location information of the second terminal is generated according to the location and direction information of the first terminal and the location information of the second terminal.

The server performs spatial calculation according to the 3D model, maps the location information of the second terminal to a 2-dimensional location of a view finder of the camera of the first terminal, and displays the AR information at the 2-dimensional location.

Specifically, the AR information is drawn on the image information by using a computer graph processing technology, to obtain the image information sent to the first terminal for display and drawn with the AR information.

The technical solutions provided by the above embodiments can be employed to avoid the following drawbacks in the prior art: the determined location as obtained is usually inaccurate; when mutual information indicates that the terminals enter a location where they are close to each other, positioning cannot be performed on the interfaces of the terminals; if the environment is complicated, it is very difficult for the user to quickly perform accurate and direct judgment, and even completely impossible to obtain more accurate mutual suggestive location information. The technical solutions can help the user to perform quick positioning judgment; furthermore, it is possible to more directly combine more interactable content or presented information with the real scenario; this may be implemented through the mobile terminals such as mobile phones without using extra hardware devices.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 7:
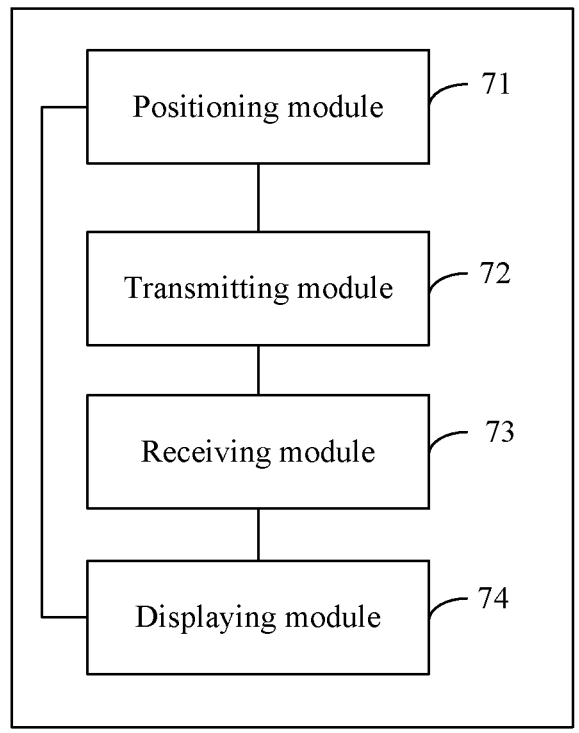
FIG. 7 is a block diagram of an augmented reality positioning apparatus for location-based service LBS according to another embodiment of the present disclosure.

FIG. 7 is a block diagram of an augmented reality positioning apparatus for location-based service LBS according to another embodiment of the present disclosure. As shown in FIG. 7, the apparatus comprises a positioning module 71, a transmitting module 72, a receiving module 73 and a displaying module 74; wherein the positioning module is configured to obtain location information and direction information of a terminal;

the transmitting module is configured to transmit the location direction and direction information to a server;

the receiving module is configured to receive AR information transmitted by the server, the AR information being generated according to the location information of the second terminal;

the display module is configured to display the image information drawn with the AR information.

Preferably, the AR information comprises a 3D model carrying the location and direction information of the first terminal and the location information of the second terminal. The apparatus further comprises a drawing module configured to draw the AR information to the image information.

Preferably, the transmitting module is used to transmit the image information to the server; the receiving the AR information transmitted by the server comprises: receiving the image information transmitted by the server end and drawn with the AR information.

Figure 8:
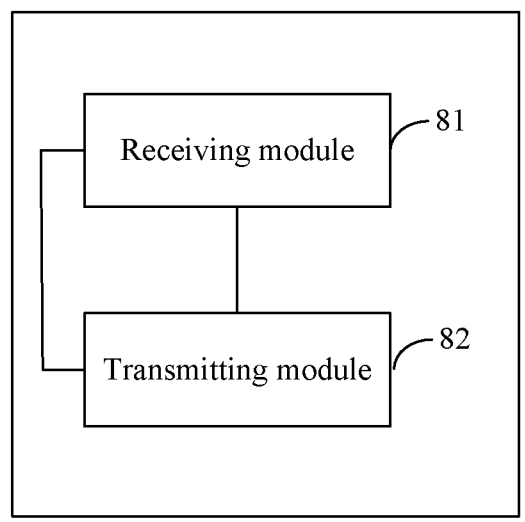
FIG. 8 is a block diagram of an augmented reality positioning apparatus for location-based service LBS according to another embodiment of the present disclosure.

FIG. 8 is a block diagram of an augmented reality positioning apparatus for location-based service LBS according to another embodiment of the present disclosure. As shown in FIG. 8, the apparatus comprises a receiving module 81 and a transmitting module 82; wherein, the receiving module is configured to receive location information and direction information transmitted by terminals, the terminals comprising a first terminal and a second terminal;

the transmitting module is configured to transmit AR information to the first terminal. The AR information is generated based on the location information and direction information of the second terminal so that the first terminal, upon obtaining image information captured by the camera, displays the image information drawn with the AR information.

Preferably, the AR information comprises a 3D model carrying the location and direction information of the first terminal and the location information of the second terminal. The image information drawn with the AR information is drawn by the first terminal.

Preferably, the receiving module is configured to receive the image information transmitted by the first terminal; the transmitting the AR information to the first terminal comprises: transmitting the image information drawn with the AR information to the first terminal.

Those skilled in the art may clearly understand for the sake of convenient and brief description, a specific working procedure of the aforesaid terminals and server is not detailed any more here and reference may be made to the corresponding procedures in the above method embodiment.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 9:
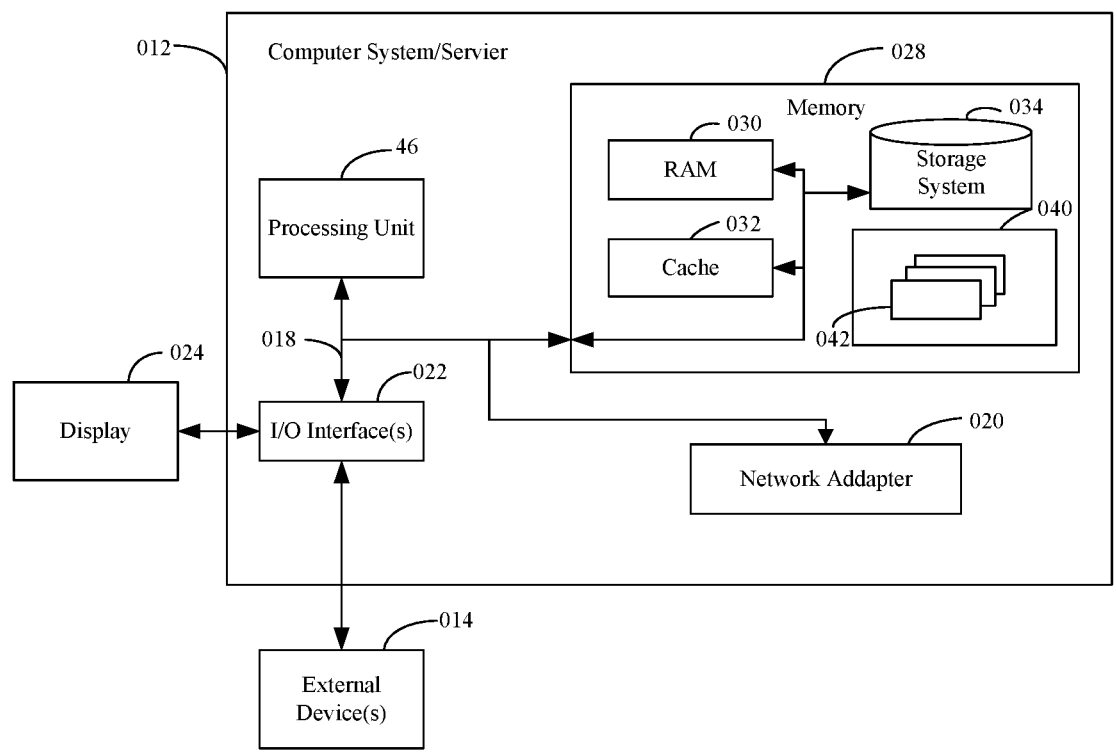
FIG. 9 is a block diagram of an example computer system/server adapted to implement an embodiment of the present disclosure.

FIG. 9 illustrates a block diagram of an example computer system/server 012 adapted to implement an implementation mode of the present disclosure. The computer system/server 012 shown in FIG. 9 is only an example and should not bring about any limitation to the function and scope of use of the embodiments of the present disclosure.

As shown in FIG. 9, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 9, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in the embodiments described in the present disclosure by running programs stored in the memory 028.

The above computer program may be stored in a computer storage medium, i.e., the computer storage medium is encoded with a computer program. The program, when executed by one or more computers, enables one or more computers to execute steps of the method and/or operations of the apparatus shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. An augmented reality positioning method for location-based service LBS, wherein the method executed by a first terminal comprises:
    triggering a real scene navigation between a first terminal and a second terminal when a distance of the first terminal and a second terminal is smaller than a preset distance;
    transmitting location information and direction information of the first terminal to a server;
    receiving AR information transmitted by the server, wherein the AR information comprises: a 3D model carrying the location information and the direction information of the first terminal and the location information of the second terminal; and
    mapping the location information of the second terminal according to the 3D model to a 2-dimensional location of a view finder of a camera of the first terminal, and displaying the AR information at the 2-dimensional location of the view finder of the camera.

2. The augmented reality positioning method for location-based service LBS according to claim 1, wherein the real scene navigation is triggered when the first terminal is in a plane navigation mode and a tilt angle posture of the first terminal being in a preset range.

3. The augmented reality positioning method for location-based service LBS according to claim 1, wherein the AR information comprises:
    distance information of the first terminal and second terminal, relevant prompt auxiliary information.

4. The augmented reality positioning method for location-based service LBS according to claim 1, further comprising:
    capturing an image or video by the camera of the first terminal, and transmitting the image or video to the server;
    receiving from the server, the location information and the direction information of the first terminal calibrated by the server according to the image or video.

5. The augmented reality positioning method for location-based service LBS according to claim 1, wherein the preset distance is 20 m.

6. An augmented reality positioning method for location-based service LBS, wherein the method executed by a server comprises:
    during a real scene navigation between a first terminal and a second terminal which is triggered when a distance of the first terminal and the second terminal is smaller than a preset distance,
    receiving from the first terminal, location information and direction information of the first terminal;
    receiving from the second terminal, location information of the second terminal;
    generating AR information comprising a 3D model carrying the location information and the direction information of the first terminal and the location information of the second terminal; and
    sending the AR information to the first terminal, so that the first terminal maps the location information of the second terminal according to the 3D model to a 2-dimensional location of a view finder of a camera of the first terminal, and displaying the AR information at the 2-dimensional location of the view finder of the camera.

7. The augmented reality positioning method for location-based service LBS according to claim 6, wherein the AR information comprises:
    distance information of the first terminal and second terminal, relevant prompt auxiliary information.

8. The augmented reality positioning method for location-based service LBS according to claim 6, further comprising:
    receiving from the first terminal an image or video captured by the camera of the first terminal;
    calibrating the location information and the direction information of the first terminal according to the image or video; and
    sending the location information and the direction information of the first terminal calibrated to the first terminal.

9. A first terminal, comprising:
    one or more processors;
    a storage device for storing one or more programs,
    when said one or more programs are executed by said one or more processors, said one or more processors are enabled to implement the following operation:
    triggering a real scene navigation between a first terminal and a second terminal when a distance of the first terminal and a second terminal is smaller than a preset distance;
    transmitting location information and direction information of the first terminal to a server;
    receiving AR information transmitted by the server, wherein the AR information comprises: a 3D model carrying the location information and the direction information of the first terminal and the location information of the second terminal; and
    mapping the location information of the second terminal according to the 3D model to a 2-dimensional location of a view finder of a camera of the first terminal, and displaying the AR information at the 2-dimensional location of the view finder of the camera.

10. The first terminal according to claim 9, wherein the real scene navigation is triggered when the first terminal is in a plane navigation mode and a tilt angle posture of the first terminal being in a preset range.

11. The first terminal according to claim 9, wherein the AR information comprises:
    distance information of the first terminal and second terminal, relevant prompt auxiliary information.

12. The first terminal according to claim 9, further comprising:
    capturing an image or video by the camera of the first terminal, and transmitting the image or video to the server;
    receiving from the server, the location information and the direction information of the first terminal calibrated by the server according to the image or video.

13. A server, comprising:
    one or more processors;
    a storage device for storing one or more programs, when said one or more programs are executed by said one or more processors, said one or more processors are enabled to implement the following operation:

during a real scene navigation between a first terminal and a second terminal which is triggered when a distance of the first terminal and the second terminal is smaller than a preset distance, receiving from the first terminal, location information and direction information of the first terminal;

receiving from the second terminal, location information of the second terminal;

generating AR information comprising a 3D model carrying the location information and the direction information of the first terminal and the location information of the second terminal; and sending the AR information to the first terminal, so that the first terminal maps the location information of the second terminal according to the 3D model to a 2-dimensional location of a view finder of a camera of the first terminal, and displaying the AR information at the 2-dimensional location of the view finder of the camera.

14. The server according to claim 13, wherein the AR information comprises:

distance information of the first terminal and second terminal, relevant prompt auxiliary information.

15. The server according to claim 13, further comprising:

receiving from the first terminal an image or video captured by the camera of the first terminal;

calibrating the location information and the direction information of the first terminal according to the image or video; and sending the location information and the direction information of the first terminal calibrated to the first terminal.

16. A non-transitory computer-readable storage medium on which a computer program is stored, wherein the program, when executed by a processor of a first terminal, implements the following operation:

triggering a real scene navigation between a first terminal and a second terminal when a distance of the first terminal and a second terminal is smaller than a preset distance;

transmitting location information and direction information of the first terminal to a server;

receiving AR information transmitted by the server, wherein the AR information comprises: a 3D model carrying the location information and the direction information of the first terminal and the location information of the second terminal; and mapping the location information of the second terminal according to the 3D model to a 2-dimensional location of a view finder of a camera of the first terminal, and displaying the AR information at the 2-dimensional location of the view finder of the camera.

17. The non-transitory computer-readable storage medium according to claim 16, wherein the real scene navigation is triggered when the first terminal is in a plane navigation mode and a tilt angle posture of the first terminal being in a preset range.

18. The non-transitory computer-readable storage medium according to claim 16, wherein the AR information comprises:

distance information of the first terminal and second terminal, relevant prompt auxiliary information.

19. The non-transitory computer-readable storage medium according to claim 16, further comprising:

capturing an image or video by the camera of the first terminal, and transmitting the image or video to the server;

receiving from the server, the location information and the direction information of the first terminal calibrated by the server according to the image or video.

20. A non-transitory computer-readable storage medium on which a computer program is stored, wherein the program, when executed by a processor, implements the following operation:

during a real scene navigation between a first terminal and a second terminal which is triggered when a distance of the first terminal and the second terminal is smaller than a preset distance, receiving from the first terminal, location information and direction information of the first terminal;

receiving from the second terminal, location information of the second terminal;

generating AR information comprising a 3D model carrying the location information and the direction information of the first terminal and the location information of the second terminal; and sending the AR information to the first terminal, so that the first terminal maps the location information of the second terminal according to the 3D model to a 2-dimensional location of a view finder of a camera of the first terminal, and displaying the AR information at the 2-dimensional location of the view finder of the camera.

21. The non-transitory computer-readable storage medium according to claim 20, wherein the AR information comprises:

distance information of the first terminal and second terminal, relevant prompt auxiliary information.

22. The non-transitory computer-readable storage medium according to claim 20, further comprising:

receiving from the first terminal an image or video captured by the camera of the first terminal;

calibrating the location information and the direction information of the first terminal according to the image or video; and sending the location information and the direction information of the first terminal calibrated to the first terminal.

* * * * *